(12) United States Patent
Arnaud

(10) Patent No.: US 7,891,610 B2
(45) Date of Patent: Feb. 22, 2011

(54) ROTARY FLAP

(75) Inventor: Gilles Louis Arnaud, Marseilles (FR)

(73) Assignee: Eurocopter, Marignane Codex (FR)

( * ) Notice: Subject to any disclaimer, the term of this patent is extended or adjusted under 35 U.S.C. 154(b) by 741 days.

(21) Appl. No.: 11/601,681

(22) Filed: Nov. 20, 2006

(65) Prior Publication Data

US 2007/0063109 A1    Mar. 22, 2007

Related U.S. Application Data

(62) Division of application No. 10/823,604, filed on Apr. 14, 2004, now abandoned.

(30) Foreign Application Priority Data

Apr. 14, 2003    (FR) .................................. 03 04635

(51) Int. Cl.
    *B64C 9/28*    (2006.01)
(52) U.S. Cl. ........................ 244/211; 244/212; 244/215; 244/17.11; 244/17.25
(58) Field of Classification Search .................. 244/211, 244/212, 215, 17.11, 17.25
    See application file for complete search history.

(56) References Cited

U.S. PATENT DOCUMENTS

| 2,152,033 | A | 3/1939 | Dornier |
| 5,320,491 | A | 6/1994 | Coleman et al. |
| 5,374,162 | A | 12/1994 | Green |
| 2002/0005458 | A1 | 1/2002 | Carter et al. |
| 2005/0151030 | A1 | 7/2005 | Arnaud |

FOREIGN PATENT DOCUMENTS

GB           734446           8/1955

OTHER PUBLICATIONS

Straub, Friedrich K. et al.: "Design of a servo-flap rotor for reduced control loads," Smart Materials & Structures, IOP Publishing Ltd., Bristol, GB, vol. 5, No. 1, Feb. 1, 1996, pp. 68-75, XP 000553229, ISSN: 0964-1726.

*Primary Examiner*—J. Woodrow Eldred
(74) *Attorney, Agent, or Firm*—Brooks Kushman P.C.

(57) ABSTRACT

The rotary flap (1) is liable to turn about a longitudinal axis of rotation (4) defined according to the first span (5) of said flap (1), said flap (1) having a profile (6) extending along the chord (CO) and comprising a first leading edge (7), a first trailing edge (8), an inner surface (9) and an outer surface (10), The inner surface (9) and outer surface (10) have non-concave shapes, first leading edge (7) having a rounded shape provided with a curve radius (R) more or less constant or elliptical in shape whose first major axis to minor axis quotient is less than or equal to 1.5, with first trailing edge (8) having a main angle ($\alpha$) that is included between 10° and 30°, and axis of rotation (4) is situated at a first distance (C1) from first leading edge (7), that is included between 15% and 35% of the chord (CO) of flap (1).

11 Claims, 2 Drawing Sheets

Fig.1
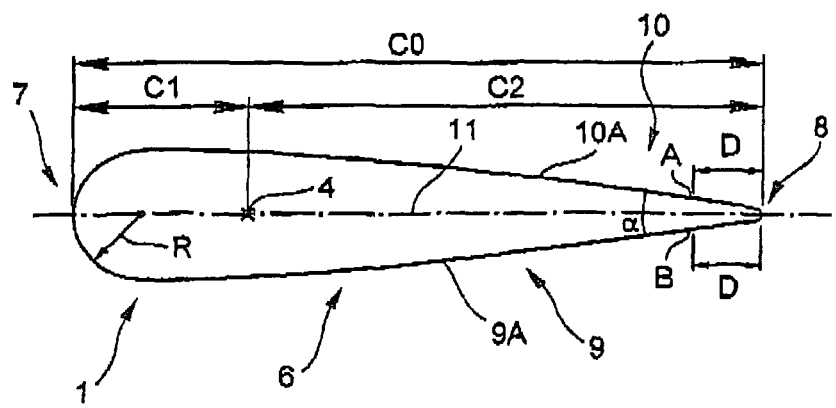
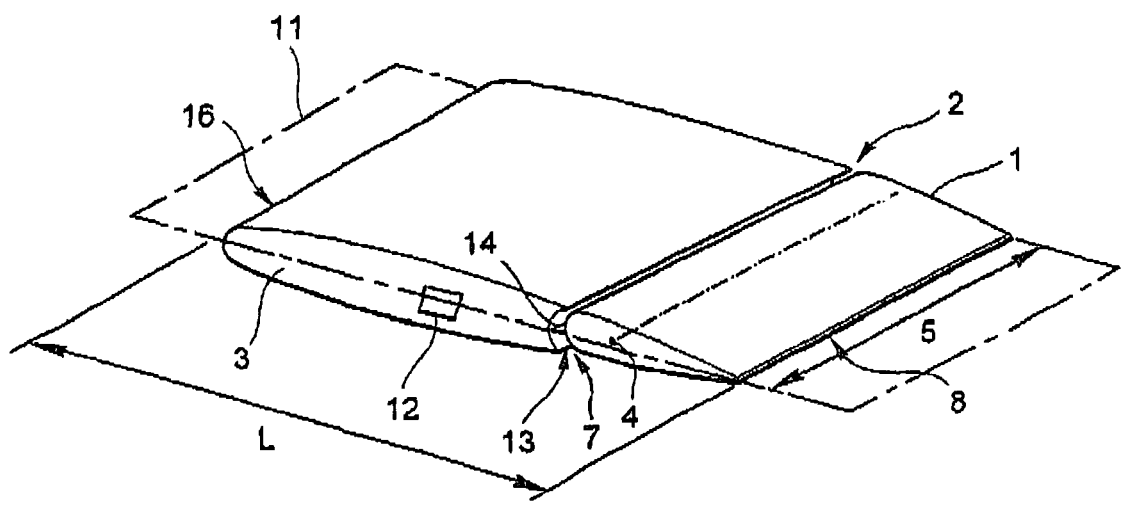
Fig.2

ROTARY FLAP

This invention concerns a rotary flap designed to be fitted to a lifting surface.

BACKGROUND OF THE INVENTION

More particularly but not exclusively, said lifting surface at the trailing edge of which the flap is mounted, is a helicopter rotor blade, in particular a blade of the helicopter main advance and lifting rotor. However, it may also consist of a rotorcraft blade or that of a convertible aircraft or the lifting surface of such an aircraft such as a horizontal stabilizer wing, for instance.

It is known that the flap trailing edge of a helicopter rotor blade is controlled for its angle of attack being steered through actuating means that:
either include one customary actuator, for instance of the electromagnetic type;
or consist of "intelligent" materials of the piezo-electric, magneto-restrictive or shape memory type.

In practice, it is found that on a blade of this type referred to as "active", excessive steering limitations on the flap intervene systematically thus reducing the performances of the blade. In particular, these limitations are due to the high hinge moment of the flap, i.e. the moment that has to be overcome to maneuver the flap about its axis of rotation. Therefore, for example, means of actuation based on piezo-electric material have energy and mass characteristics that are insufficient to overcome the entire hinge moment and control the flap at the frequencies generally required during a flight, efficiently control the vibration, or significantly decrease the aircraft sound level. Similarly, to overcome the hinge moment, the customary operating resources call for relatively heavy and bulky plants that are often difficult to accommodate in the blade.

Consequently, the known actuating resources will not permit optimum steering (in particular in terms of performance) of the flap because more particularly of the existence of too high a hinge moment.

SUMMARY OF THE INVENTION

This invention is designed to overcome these drawbacks by proposing a rotary flap with minimized hinge moment.

For this purpose, according to the invention, the rotary flap that is liable to rotate about a longitudinal axis of rotation defined according to the first span of said flap, with said flap having a profile extending along the flap chord and including a first leading edge, a first trailing edge, and inner surface and an outer surface, is remarkable in that:
said inner surface and said outer surface have, beyond 25% of the flap chord, shapes that are not concave;
said first leading edge has a rounded shape with a curve radius more or less constant or, otherwise, an elliptical shape whose first major axis to minor axis quotient is less than or equal to 1.5;
said first trailing edge has a main angle included between 10° and 30°; and
said axis of rotation is situated at a first distance from said first leading edge, which is included between 15% and 35% of the chord of said flap.

Thus, thanks to the properties (in particular geometrical) mentioned above, the flap described in the invention has a very reduced hinge moment when it is mounted on a lifting surface, but without losing any efficiency in doing so. This results in an energy gain for actuating (by rotating) the flap and therefore, in particular, also a gain in mass.

Accordingly, it is possible to use known and aforementioned activating means to actuate said flap in an optimum manner, and thus overcome the previously indicated drawbacks.

Within the scope of this invention, said inner and said outer surfaces, as non-concave shapes, may have forms that are approximately linear or may be convex.

In addition, advantageously, said first trailing edge has an elliptical shape whose second major axis to minor axis quotient is greater than or equal to 1.5 and, preferably, is approximately equal to 2. Indeed, ideally, the first trailing edge should be beveled but it is impossible to produce a perfect level by industrial means because a very slight rounding off of the first trailing edge is necessary to prevent the breakage of the composite fibers enclosing this first trailing edge. Conversely, the curve radius of the first trailing edge must not be too large, so as to set the confluence points of the air flows on the inner and outer surface and thus prevent a diversion around the first trailing edge by the air flows, which would be detrimental to the aerodynamic efficiency of the flap.

Furthermore, in a preferred embodiment, said main angle of the first trailing edge is approximately 20° and/or said axis of rotation of the flap is situated at a first distance from the first leading edge, corresponding approximately 25.5% of the chord so as to bring the axis of the hinge, the aerodynamic focus and the center of gravity of said flap to correspond as accurately as possible.

This invention also concerns a lifting surface, for instance the rotor blade of a helicopter or an aircraft wing, provided with a second leading edge, as well as a second trailing edge, and which includes in addition at least one flap mounted to rotate on the second trailing edge while leaving a clearance between said second trailing edge of the lifting surface, and the first leading edge of the flap.

According to the invention, said lifting surface is outstanding in that said flap is of the aforementioned type.

In an advantageous manner, said clearance between the second trailing edge of the lifting surface and the first leading edge of the flap:
is included between 1.5% and 3.5% of the flap chord and, preferably, corresponds to 2% of said chord; and/or
is included between 0.4% and 0.8% of a total length separating said second leading edge from said first trailing edge and, preferably, corresponds to 0.5% of this total length.

Advantageously, the second trailing edge of the lifting surface partially covers the first leading edge of the flap. In addition, in an advantageous manner, said partial overlapping of the first leading edge of the flap by the second trailing edge of the lifting surface is less than approximately 10% of the flap chord. Thus, the greater part of the first leading edge of the flap bathes in the fluid flow, having the effect of recentering the aerodynamic focus of the flap between 15% and 35% approximately so that it becomes more or less one and the same as the hinge axis. This results in a decrease of the flap hinge moment.

Furthermore, to avoid unwanted aerodynamic recirculation, the lifting surface conforming to the invention includes in addition, at least one filling means, preferably deformable, to fill the opening created by said clearance. In addition, in an advantageous manner, said filling means is located in a reference surface of the lifting surface.

In a particular embodiment, said lifting surface includes a multitude of flaps arranged according to the second span of said lifting surface. This arrangement of said flaps is chosen to prevent them blocking under the effect of the overall deformation in the lifting surface (for instance a blade) during the flight. A succession of (elementary) flaps is recommended whose first span does not exceed (in each case) 15% of the second span and is preferably included between 7% and 10%.

BRIEF DESCRIPTION OF THE DRAWINGS

The figures of the attached drawing illustrate exactly how the invention can be produced. In these figures, identical references designate similar elements.

FIG. 1 is a schematic view of the profile of a flap conforming to the invention.

FIG. 2 is a schematic view of the profile of a lifting surface conforming to the invention provided with a rotary flap.

DESCRIPTION OF THE PREFERRED EMBODIMENTS

Figure 3:
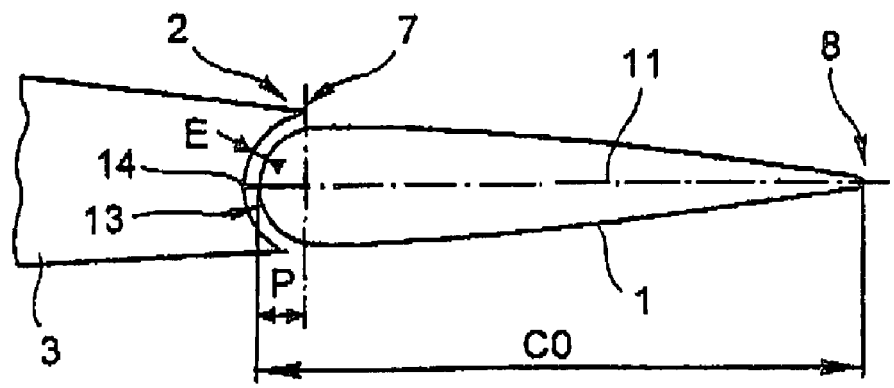
FIG. 3 is a schematic view of the profile of a flap conforming to the invention, combined with a lifting surface represented in part.

A flap 1 conforming to the invention and shown schematic only in FIG. 1 is liable to be mounted to rotate on the second trailing edge 2 of a lifting surface 3, as shown in FIG. 2. For this purpose, said flap 1 is liable to rotate about an axis of rotation 4 (or hinged axis), defined according to the first span 5 of said flap 1 and therefore according to the span of the lifting surface 3 specified below.

In the customary manner, said flap 1 has a profile 6 (the contour of the section represented in FIG. 1) extending according to the chord CO and includes a first leading edge 7, a first trailing edge 8, an inner surface 9 and an outer surface 10.

To reduce the hinge moment, that is, the moment to be overcome to rotate flap 1 about its axis of rotation 4, according to the invention, said flap 1 has the following combined characteristics:

a) said inner surface 9 and said outer surface 10 have, beyond 25% of the flap 1 chord CO, shapes that are not concave; In the embodiment shown in FIG. 1, they present more specifically shapes 9A and 10A that are more or less linear. However, they may also have convex shapes;

b) said first leading edge 7 has preferably a rounded shape with a curve radius R more or less constant or, otherwise, an elliptical shape whose first major axis to minor axis quotient is less than or equal to 1.5;

c) said first trailing edge 8 has a main angle α, separating the two straight lines respectively tangent to outer surface 10 and inner surface 9 of flap 1 at two points A,B situated respectively on the outer surface 10 and inner surface 9 at a second distance D from first trailing edge 8 more or less equal to 10% of chord CO, which is included between 10° and 30° and which is preferably close to 20°; and d) said axis of rotation 4 is situated at a first distance C1 from said first leading edge 7, which is included between 15% and 35% of the chord CO of said flap 1.

It will be noted that, the property d) as specified will cause a minimum aerodynamic moment said aerodynamic moment representing the greater share of the global hinge moment to be overcome to maneuver the flap 1, provided the excitation frequencies do not exceed 30 Hz to 50 Hz approximately; and the properties a) to c) concerned geometrical shapes which, when combined, contribute to reducing the aerodynamic share of the hinge moment.

In addition, according to the invention, said first trailing edge 8 has an elliptical shape of which the second major axis to minor axis quotient is greater than 1.5, and preferably approximately equal to 2.

In addition, in a preferred embodiment, said axis of rotation 4 of flap 1 is placed at a first distance C1 from the first leading-edge 7 corresponding approximately to 25.5% of chord CO. In this case, the following approximate ratios are obtained with C2 being placed between said axis of rotation 4 and first trailing edge 8 of flap 1:

$C1/CO=0.255$ $C1/C2=0.343$ $C2/CO=0.744$

Thus, thanks to the properties a) to d) mentioned above, flap 1 described in the invention has a very reduced hinge moment when it is mounted on a lifting surface 3, but without losing too much efficiency in doing so. This results in an energy gain for actuating (by rotating) flap 1 and a gain in mass. In this way, it is possible to use the customary means of actuation to ensure optimum actuation of said flap 1 conforming to the invention.

As can be seen in FIG. 2, flap 1 may be mounted on a lifting surface 3 (for instance on a helicopter blade or an aircraft wing or stabilizer) so as to be moved in rotation through the customary actuating means 12 as depicted diagrammatically. As an example, these actuating means 12 may be of the electromagnetic type or based on so-called "intelligent" materials of the piezo-electric, magneto-restrictive or shape memory type, for instance.

Flap 1 is mounted on lifting surface 3 in such a way as to create a clearance 13 between the second trailing edge 2 of lifting surface 3 and the first leading edge of 7 of flap 1, to prevent mechanical locking during the actuation of flap 1, for instance because of the mechanical deformation of lifting surface 3 or flap 1, or of its actuator, under centrifugal and aerodynamic forces.

According to the innovation, said clearance 13:

is included between 1.5% and 3.5% of the flap 1 chord CO and, preferably, corresponds to 2%; and/or is included between 0.4% and 0.8% of a total length L separating the second leading edge 16 from first trailing edge 8 and, preferably, corresponds to 0.5% of this total length L.

In addition, according to the invention, flap 1 includes the customary filling means 14, of a seal type, to block said clearance 13 (i.e., the opening created by clearance 13) and thus avoid unwanted aerodynamic recirculation which could considerably increase the hinge moment and decrease the lifting efficiency of flap 1. These filling means 14 could be rubber padding attached to the first leading edge 7 of flap 1 or pieces of fabric attached to lifting surface 3 and flat 1, preferably within a reference surface 11 defined by all the straight lines joining the first leading edge 7 to the first trailing edge 8 when flap 1 is in the neutral position, i.e. when the first 7,8 and the second 16,2 leading and training edges are more or less aligned.

In a particular embodiment shown in FIG. 3, the second trailing edge 2 of lifting surface 3 partially overlaps the first leading edge 7 of flap 1. In addition, said partial overlapping P of the first leading edge 7 by the second trailing edge 2 is less than 10% of the chord CO of flap 1. In this FIG. 3, we have also highlighted the width E of clearance 13 between said second trailing edge 2 and said first leading edge 7.

Figure 4:
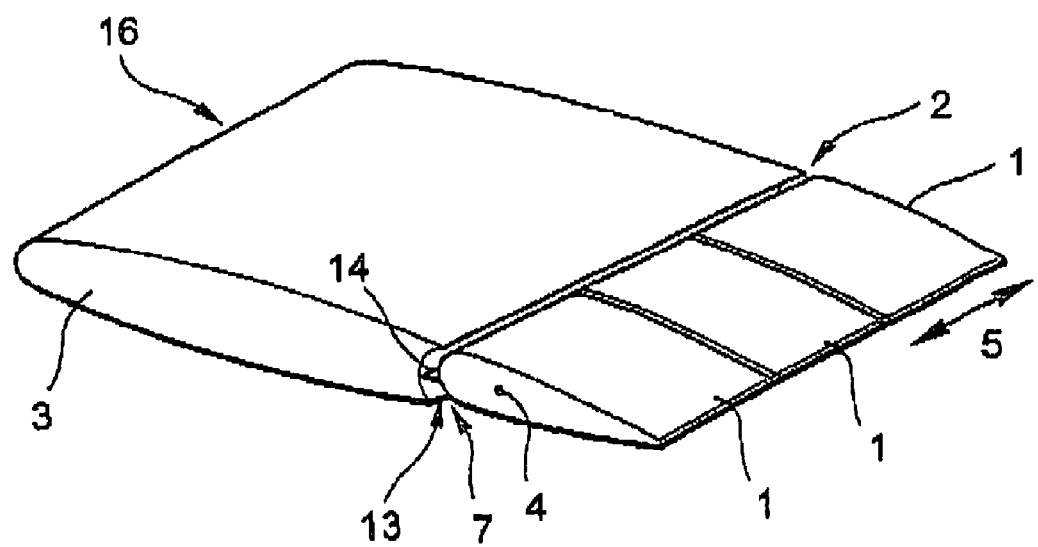
FIG. 4 is a schematic view of the profile of a lifting surface provided with a multitude of flaps conforming to the invention.

Furthermore, in a particular embodiment shown in FIG. 4, lifting surface 3, of which only a section is depicted in this FIG. 4, includes a multitude of flaps 1 of the aforementioned type, set out along the second span of lifting surface 3.in addition, the first span 5 of each of said flaps 1 is less than or equal to 15% of the second span and is preferably included between 7% and 10% of this second span.

In a preferred embodiment, this invention is applied to the main advance and lifting rotor blades of a helicopter in which the lifting surface 3 part illustrated in FIG. 2 (or in FIG. 4) represents, in this case, a blade section.

In this way, this invention and allows the vertical trajectory of each blade to be controlled on each revolution of the helicopter rotor, together with local distribution of the lifting force on the blade and up for the generation of turbulence from the blade in order to minimize the interaction between each blade and the turbulence formed in the outer wake of the blade, known as BVI or Played Vortex Interaction. This will reduce the noise because the impact of the marginal vortex causes local variations in pressure, generating impulsive noise. It will minimize the components in (b−1)Ω, bΩ and (b+1)Ω of the forces on the blade (where b is the number of blades and Ω the rotor rotation configuration), resulting in a considerable reduction of helicopter vibration levels and accordingly, a substantial improvement of comfort in the cabin.

Thanks to the arrangement of flaps 1 conforming to the invention on the helicopter blades, it is therefore possible to create vertical speed variations known as "induced speeds" on the trailing edge of the entire flap-blade assembly so as to modify the trajectory of the vortex effects and, whenever possible, avoid interactions.

The invention claimed is:

1. A method of reducing a hinge moment of a flap (1) on a helicopter rotor blade (3), the method comprising the steps of:
 providing the flap with a profile that includes an inner surface (9) and an outer surface (10) that have, beyond 25% of a chord (CO) of the flap, shapes that are not concave;
 providing the flap with a first trailing edge (8) that has a main angle (α) between 10° and 30°;
 setting a longitudinal axis of rotation (4) of the flap at a first distance (C1) from a first leading edge (7) of the flap, the first distance being between 15% and 35% of the chord of the flap;
 attaching the flap (1) to a trailing edge (2) of the helicopter rotor blade (3) so that the flap turns about the longitudinal axis of rotation (4); and
 steering the flap relative to the helicopter rotor blade during rotation of the rotor blade while preserving an aerodynamic efficiency of the flap.

2. The method of claim 1, wherein the first leading edge is provided with a rounded shape having a generally constant curve radius (R).

3. The method of claim 1, wherein the first leading edge is provided with an elliptical shape whose first major axis to minor axis quotient is less than or equal to 1.5.

4. The method of claim 1, wherein the main angle (α) is approximately 20°.

5. The method of claim 1, wherein the first trailing edge is provided with an elliptical shape whose second major axis to minor axis quotient is greater than or equal to 1.5.

6. The method of claim 5, wherein the second major axis to minor axis quotient is approximately equal to 2.

7. The method of claim 1, wherein the first distance (C1) from the first leading edge (7) is about 25% of the chord (CO).

8. The method of claim 1, wherein the step of attaching the flap includes providing a clearance between the first leading edge of the flap and the trailing edge of the helicopter rotor blade that 1.5% to 3.5% of the chord of the flap.

9. The method of claim 1, wherein the step of attaching the flap includes overlapping the first leading edge of the flap with the trailing edge of the helicopter rotor blade, the overlapping being less than 10% of the chord of the flap.

10. The method of claim 1, wherein the inner surface and the outer surface have, beyond 25% of the chord of the flap, shapes that are generally linear.

11. A method of reducing a hinge moment of a flap (1) on a helicopter rotor blade (3), the method comprising the steps of:
 providing the flap with a profile that includes an inner surface (9) and an outer surface (10) that have, beyond 25% of a chord (CO) of the flap, shapes that are generally linear;
 providing the flap with a first trailing edge (8) that has a main angle (α) of approximately 20°;
 providing the flap with a first leading edge (7) that has a rounded shape with a generally constant curve radius (R);
 setting a longitudinal axis of rotation (4) of the flap at a first distance (C1) from the first leading edge of the flap, the first distance being about 25% of the chord of the flap;
 attaching the flap (1) to a trailing edge (2) of the helicopter rotor blade (3) so that the flap turns about the longitudinal axis of rotation (4);
 when attaching the flap, overlapping the first leading edge of the flap with the trailing edge of the helicopter rotor blade, the overlapping being less than 10% of the chord of the flap; and
 steering the flap relative to the helicopter rotor blade during rotation of the rotor blade while preserving an aerodynamic efficiency of the flap.

\* \* \* \* \*